(12) United States Patent
Murnane et al.

(10) Patent No.: US 9,233,451 B2
(45) Date of Patent: *Jan. 12, 2016

(54) SOFT AND CONDITIONABLE CHEMICAL MECHANICAL POLISHING PAD STACK

(71) Applicants: Rohm and Haas Electronic Materials CMP Holdings, Inc., Newark, DE (US); Dow Global Technologies LLC, Midland, MI (US)

(72) Inventors: James Murnane, Norristown, PA (US); Bainian Qian, Newark, DE (US); John G. Nowland, Elkton, MD (US); Michelle K. Jensen, Newark, DE (US); Jeffrey James Hendron, Elkton, MD (US); Marty W. DeGroot, Middletown, DE (US); David B. James, Newark, DE (US); Fengji Yeh, Wilmington, DE (US)

(73) Assignees: Rohm and Haas Electronic Materials CMP Holdings, Inc., Newark, DE (US); Dow Global Technologies LLC, Midland, MI (US)

( * ) Notice: Subject to any disclaimer, the term of this patent is extended or adjusted under 35 U.S.C. 154(b) by 302 days.

This patent is subject to a terminal disclaimer.

(21) Appl. No.: 13/906,715

(22) Filed: May 31, 2013

(65) Prior Publication Data

US 2014/0357169 A1 Dec. 4, 2014

(51) Int. Cl.
| | | |
|---|---|---|
| *B24B 37/24* | (2012.01) | |
| *C08G 18/32* | (2006.01) | |
| *C08G 18/66* | (2006.01) | |
| *B24B 37/20* | (2012.01) | |
| *B24B 37/22* | (2012.01) | |

(52) U.S. Cl.
CPC .............. *B24B 37/245* (2013.01); *B24B 37/205* (2013.01); *B24B 37/22* (2013.01); *C08G 18/3278* (2013.01); *C08G 18/6644* (2013.01)

(58) Field of Classification Search
CPC ........... C08G 18/3278; C08G 18/3284; C08G 18/6517; B24B 37/205; B24B 37/22; B24B 37/24; B24B 3/28; B24D 11/00; B24D 11/001; B24D 11/002
See application file for complete search history.

(56) References Cited

U.S. PATENT DOCUMENTS

| | | | |
|---|---|---|---|
| 5,212,910 A | 5/1993 | Breivogel et al. | |
| 5,245,790 A | * 9/1993 | Jerbic | 451/159 |
| 5,257,478 A | 11/1993 | Hyde et al. | |

(Continued)

OTHER PUBLICATIONS

Misumi Urethanes/Rubbers FAQ, Misumi USA, available at http://us.misumi-ec.com/maker/misumi/mech/product/ur/faq (accessed Mar. 3, 2015).*

(Continued)

*Primary Examiner* — Scott R Walshon
(74) *Attorney, Agent, or Firm* — Thomas S. Deibert

(57) ABSTRACT

A chemical mechanical polishing pad stack is provided containing: a polishing layer; a rigid layer; and, a hot melt adhesive bonding the polishing layer to the rigid layer; wherein the polishing layer comprises the reaction product of ingredients, including: a polyfunctional isocyanate; and, a curative package; wherein the curative package contains an amine initiated polyol curative and a high molecular weight polyol curative; wherein the polishing layer exhibits a density of greater than 0.6 g/cm$^3$; a Shore D hardness of 5 to 40; an elongation to break of 100 to 450%; and, a cut rate of 25 to 150 μm/hr; and, wherein the polishing layer has a polishing surface adapted for polishing the substrate.

18 Claims, 7 Drawing Sheets

(56) References Cited

U.S. PATENT DOCUMENTS

| | | | |
|---|---|---|---|
| 5,287,663 A | 2/1994 | Pierce et al. | |
| 5,489,233 A | 2/1996 | Cook et al. | |
| 5,578,362 A | 11/1996 | Reinhardt et al. | |
| 5,632,789 A * | 5/1997 | Ryoke et al. | 51/295 |
| 5,692,950 A | 12/1997 | Rutherford et al. | |
| 5,752,875 A | 5/1998 | Ronay | |
| 6,524,164 B1 | 2/2003 | Tolles | |
| 6,645,264 B2 | 11/2003 | Hasegawa et al. | |
| 6,790,883 B2 | 9/2004 | Ogawa et al. | |
| 6,992,123 B2 | 1/2006 | Shiho et al. | |
| 7,077,879 B2 | 7/2006 | Ogawa et al. | |
| 7,101,275 B2 | 9/2006 | Roberts et al. | |
| 7,132,033 B2 | 11/2006 | Boldizar et al. | |
| 7,217,179 B2 | 5/2007 | Sakurai et al. | |
| 7,488,236 B2 | 2/2009 | Shimomura et al. | |
| 7,651,761 B2 | 1/2010 | Shimomura et al. | |
| 7,704,125 B2 | 4/2010 | Roy et al. | |
| 7,922,783 B2 | 4/2011 | Sakurai et al. | |
| 7,927,452 B2 | 4/2011 | Hirose et al. | |
| 8,052,507 B2 | 11/2011 | Huang et al. | |
| 8,066,552 B2 | 11/2011 | Duboust et al. | |
| 8,167,690 B2 | 5/2012 | Fukuda et al. | |
| 8,257,153 B2 * | 9/2012 | Fukuda et al. | 451/527 |
| 8,277,290 B2 | 10/2012 | Chiu et al. | |
| 2004/0192178 A1 | 9/2004 | Yardeni et al. | |
| 2005/0148183 A1 * | 7/2005 | Shiro et al. | 438/692 |
| 2009/0062414 A1 | 3/2009 | Huang et al. | |
| 2010/0029185 A1 | 2/2010 | Fukuda et al. | |
| 2010/0317263 A1 | 12/2010 | Hirose et al. | |
| 2011/0034578 A1 | 2/2011 | Zhang et al. | |
| 2011/0039966 A1 | 2/2011 | Goto et al. | |
| 2011/0054057 A9 * | 3/2011 | Kulp | 521/159 |
| 2011/0151240 A1 | 6/2011 | Hirose et al. | |
| 2011/0256817 A1 | 10/2011 | Fukuda et al. | |
| 2012/0009855 A1 | 1/2012 | Allison et al. | |
| 2012/0015519 A1 | 1/2012 | Huang et al. | |
| 2012/0258649 A1 | 10/2012 | Zhang et al. | |

OTHER PUBLICATIONS

Copending U.S. Appl. No. 13/906,765.
Copending U.S. Appl. No. 13/906,825.

* cited by examiner

SOFT AND CONDITIONABLE CHEMICAL MECHANICAL POLISHING PAD STACK

The present invention relates to chemical mechanical polishing pads and methods of making and using the same. More particularly, the present invention relates to a chemical mechanical polishing pad stack comprising a polishing layer; a rigid layer; and, a hot melt adhesive bonding the polishing layer to the rigid layer; wherein the polishing layer comprises the reaction product of ingredients, including: a polyfunctional isocyanate; and, a curative package; wherein the curative package contains an amine initiated polyol curative and a high molecular weight polyol curative; wherein the polishing layer exhibits a density of greater than 0.6 g/cm$^3$; a Shore D hardness of 5 to 40; an elongation to break of 100 to 450%; and, a cut rate of 25 to 150 μm/hr; and, wherein the polishing layer has a polishing surface adapted for polishing the substrate.

In the fabrication of integrated circuits and other electronic devices, multiple layers of conducting, semiconducting and dielectric materials are deposited onto and removed from a surface of a semiconductor wafer. Thin layers of conducting, semiconducting and dielectric materials may be deposited using a number of deposition techniques. Common deposition techniques in modern wafer processing include physical vapor deposition (PVD), also known as sputtering, chemical vapor deposition (CVD), plasma-enhanced chemical vapor deposition (PECVD) and electrochemical plating, among others. Common removal techniques include wet and dry isotropic and anisotropic etching, among others.

As layers of materials are sequentially deposited and removed, the uppermost surface of the wafer becomes nonplanar. Because subsequent semiconductor processing (e.g., metallization) requires the wafer to have a flat surface, the wafer needs to be planarized. Planarization is useful for removing undesired surface topography and surface defects, such as rough surfaces, agglomerated materials, crystal lattice damage, scratches and contaminated layers or materials.

Chemical mechanical planarization, or chemical mechanical polishing (CMP), is a common technique used to planarize or polish work pieces such as semiconductor wafers. In conventional CMP, a wafer carrier, or polishing head, is mounted on a carrier assembly. The polishing head holds the wafer and positions the wafer in contact with a polishing layer of a polishing pad that is mounted on a table or platen within a CMP apparatus. The carrier assembly provides a controllable pressure between the wafer and polishing pad. Simultaneously, a polishing medium (e.g., slurry) is dispensed onto the polishing pad and is drawn into the gap between the wafer and polishing layer. To effect polishing, the polishing pad and wafer typically rotate relative to one another. As the polishing pad rotates beneath the wafer, the wafer sweeps out a typically annular polishing track, or polishing region, wherein the wafer's surface directly confronts the polishing layer. The wafer surface is polished and made planar by chemical and mechanical action of the polishing layer and polishing medium on the surface.

Pad surface "conditioning" or "dressing" is critical to maintain a consistent polishing surface for stable polishing performance. Over time the polishing surface of the polishing pad wears down, smoothing over the microtexture of the polishing surface—a phenomenon called "glazing". Polishing pad conditioning is typically achieved by abrading the polishing surface mechanically with a conditioning disk. The conditioning disk has a rough conditioning surface typically comprised of embedded diamond points. The conditioning disk is brought into contact with the polishing surface either during intermittent breaks in the CMP process when polishing is paused ("ex situ"), or while the CMP process is underway ("in situ"). Typically the conditioning disk is rotated in a position that is fixed with respect to the axis of rotation of the polishing pad, and sweeps out an annular conditioning region as the polishing pad is rotated. The conditioning process as described cuts microscopic furrows into the pad surface, both abrading and plowing the pad material and renewing the polishing texture.

Semiconductor devices are becoming increasingly complex with finer features and more metallization layers. This trend requires improved performance from polishing consumables in order to maintain planarity and limit polishing defects. The latter can create electrical breaks or shorts of the conducting lines that would render the semiconductor device non-functional. It is generally known that one approach to reduce polishing defects, such as micro-scratches or chatter marks, is to use a softer polishing pad.

A family of soft polyurethane polishing layers are disclosed by James, et al. in U.S. Pat. No. 7,074,115. James et al. discloses a polishing pad comprising a reaction product of an isocyanate-terminated urethane prepolymer with an aromatic diamine or polyamine curative, wherein the reaction product exhibits a porosity of at least 0.1 volume percent, a KEL energy loss factor at 40° C. and a 1 rad/sec of 385 to 750 l/Pa, and a modulus E at 40° C. and 1 rad/sec of 100 to 400 MPa.

As described above, it is necessary to diamond condition the surface of chemical mechanical polishing pads to create a favorable microtexture for optimum polishing performance. However, it is difficult to create such texture in conventional polishing layer materials, such as those described by James et al., because these materials exhibit a high ductility, as measured by tensile elongation to break values. As a result, when these materials are subjected to conditioning with a diamond conditioning disk, rather than cutting furrows into the pad's surface, the diamonds in the conditioning disk simply push the pad material aside without cutting. Hence, very little texture is created in the surface of these conventional materials as a result of conditioning with a diamond conditioning disk.

Another related problem with these conventional chemical mechanical polishing pad materials arises during the machining process to form macro groove patterns in the pad surface. Conventional chemical mechanical polishing pads are typically provided with a groove pattern cut into their polishing surface to promote slurry flow and to remove polishing debris from the pad-wafer interface. Such grooves are frequently cut into the polishing surface of the polishing pad either using a lathe or by a CNC milling machine. With soft pad materials, however, a similar problem to that of diamond conditioning occurs, such that after the cutting bit has passed, the pad material simply rebounds and the grooves formed close in on themselves. Thus groove quality is poor and it is more difficult to successfully manufacture commercially acceptable pads with such soft materials. This problem worsens as the hardness of the pad material decreases.

Accordingly, there is a continuing need for chemical mechanical polishing pads that provide a physical property profile that correlates well with that associated with low defect formulations, but which also imparts enhanced conditionability to the polishing layer (i.e., exhibits a cut rate of 25 to 150 μm/hr).

The present invention provides a chemical mechanical polishing pad stack, comprising: a polishing layer having a polishing surface, a base surface and an average thickness, $T_{P\text{-}avg}$, measured in a direction perpendicular to the polishing surface from the polishing surface to the base surface; a rigid layer having a top surface and a bottom surface; a hot melt adhesive interposed between the base surface of the polishing layer and the top surface of the rigid layer; wherein the hot melt adhesive bonds the polishing layer to the rigid layer; optionally, a pressure sensitive platen adhesive; wherein the pressure sensitive platen adhesive is disposed on the bottom surface of the rigid; optionally, a release liner; wherein the pressure sensitive platen adhesive is interposed between the bottom surface of the rigid layer and the optional release liner; and, optionally, an endpoint detection window incorporated into the chemical mechanical polishing pad stack; wherein the polishing layer comprises the reaction product of ingredients, comprising: a polyfunctional isocyanate; and, a curative package, comprising: at least 5 wt % of an amine initiated polyol curative, wherein the amine initiated polyol curative contains at least one nitrogen atom per molecule; wherein the amine initiated polyol curative has an average of at least three hydroxyl groups per molecule; 25 to 95 wt % of a high molecular weight polyol curative, wherein the high molecular weight polyol curative has a number average molecular weight, $M_N$, of 2,500 to 100,000; and wherein the high molecular weight polyol curative has an average of 3 to 10 hydroxyl groups per molecule; and, 0 to 70 wt % of a difunctional curative; and, wherein the polishing layer exhibits a density of greater than 0.6 g/cm$^3$; a Shore D hardness of 5 to 40; an elongation to break of 100 to 450%; and, a cut rate of 25 to 150 µm/hr; and, wherein the polishing layer has a polishing surface adapted for polishing the substrate.

The present invention provides a chemical mechanical polishing pad stack, comprising: a polishing layer having a polishing surface, a base surface and an average thickness, $T_{P-avg}$, measured in a direction perpendicular to the polishing surface from the polishing surface to the base surface; a rigid layer having a top surface and a bottom surface; a hot melt adhesive interposed between the base surface of the polishing layer and the top surface of the rigid layer; wherein the hot melt adhesive bonds the polishing layer to the rigid layer; optionally, a pressure sensitive platen adhesive; wherein the pressure sensitive platen adhesive is disposed on the bottom surface of the rigid; optionally, a release liner; wherein the pressure sensitive platen adhesive is interposed between the bottom surface of the rigid layer and the optional release liner; and, optionally, an endpoint detection window incorporated into the chemical mechanical polishing pad stack; wherein the polishing layer comprises the reaction product of ingredients, comprising: a polyfunctional isocyanate; and, a curative package, comprising: at least 5 wt % of an amine initiated polyol curative, wherein the amine initiated polyol curative contains at least one nitrogen atom per molecule; wherein the amine initiated polyol curative has an average of at least three hydroxyl groups per molecule; 25 to 95 wt % of a high molecular weight polyol curative, wherein the high molecular weight polyol curative has a number average molecular weight, $M_N$, of 2,500 to 100,000; and wherein the high molecular weight polyol curative has an average of 3 to 10 hydroxyl groups per molecule; and, 0 to 70 wt % of a difunctional curative; wherein the polyfunctional isocyanate is an isocyanate-terminated urethane prepolymer having 2 to 12 wt % unreacted NCO groups; and, wherein the curative package, consists of: 5 to 20 wt % of the amine initiated polyol curative, wherein the amine initiated polyol curative contains two nitrogen atom per molecule; wherein the amine initiated polyol curative has an average of 4 hydroxyl groups per molecule; and, wherein the amine initiated polyol curative has a number average molecular weight, $M_N$, of 200 to 400; 50 to 75 wt % of the high molecular weight polyol curative, wherein the high molecular weight polyol curative has a number average molecular weight, $M_N$, of 10,000 to 12,000; and, wherein the high molecular weight polyol curative has an average of 6 hydroxyl groups per molecule; 10 to 30 wt % of the difunctional curative; wherein the difunctional curative is a diamine curative selected from the group consisting of 4,4'-methylene-bis-(2-chloroaniline) (MBOCA); 4,4'-methylene-bis-(3-chloro-2,6-diethylaniline) (MCDEA); and, isomers thereof; wherein the stoichiometric ratio of the reactive hydrogen groups in the curative package to the unreacted isocyanate groups in the polyfunctional isocyanate is 0.95 to 1.05; wherein the polishing layer exhibits a density of 0.75 to 1.0 g/cm$^3$; a Shore D hardness of 5 to 20; an elongation to break of 150 and 300%; and, a cut rate of 30 to 60 µm/hr; and, wherein the polishing layer has a polishing surface adapted for polishing the substrate.

The present invention provides a chemical mechanical polishing pad stack, consisting of: a polishing layer having a polishing surface, a base surface and an average thickness, $T_{P-avg}$, measured in a direction perpendicular to the polishing surface from the polishing surface to the base surface; a rigid layer having a top surface and a bottom surface; a hot melt adhesive interposed between the base surface of the polishing layer and the top surface of the rigid layer; wherein the hot melt adhesive bonds the polishing layer to the rigid layer; a pressure sensitive platen adhesive; wherein the pressure sensitive platen adhesive is disposed on the bottom surface of the rigid; a release liner; wherein the pressure sensitive platen adhesive is interposed between the bottom surface of the rigid layer and the release liner; and, optionally, an endpoint detection window incorporated into the chemical mechanical polishing pad stack; wherein the polishing layer comprises the reaction product of ingredients, comprising: a polyfunctional isocyanate; and, a curative package, comprising: at least 5 wt % of an amine initiated polyol curative, wherein the amine initiated polyol curative contains at least one nitrogen atom per molecule; wherein the amine initiated polyol curative has an average of at least three hydroxyl groups per molecule; 25 to 95 wt % of a high molecular weight polyol curative, wherein the high molecular weight polyol curative has a number average molecular weight, $M_N$, of 2,500 to 100,000; and wherein the high molecular weight polyol curative has an average of 3 to 10 hydroxyl groups per molecule; and, 0 to 70 wt % of a difunctional curative; and, wherein the polishing layer exhibits a density of greater than 0.6 g/cm$^3$; a Shore D hardness of 5 to 40; an elongation to break of 100 to 450%; and, a cut rate of 25 to 150 µm/hr; and, wherein the polishing layer has a polishing surface adapted for polishing the substrate.

The present invention provides a chemical mechanical polishing pad stack, consisting of: a polishing layer having a polishing surface, a base surface and an average thickness, $T_{P-avg}$, measured in a direction perpendicular to the polishing surface from the polishing surface to the base surface; a rigid layer having a top surface and a bottom surface; a hot melt adhesive interposed between the base surface of the polishing layer and the top surface of the rigid layer; wherein the hot melt adhesive bonds the polishing layer to the rigid layer; a pressure sensitive platen adhesive; wherein the pressure sensitive platen adhesive is disposed on the bottom surface of the rigid; a release liner; wherein the pressure sensitive platen adhesive is interposed between the bottom surface of the rigid layer and the release liner; and, an endpoint detection window incorporated into the chemical mechanical polishing pad stack; wherein the polishing layer comprises the reaction product of ingredients, comprising: a polyfunctional isocyanate; and, a curative package, comprising: at least 5 wt % of an amine initiated polyol curative, wherein the amine initiated polyol curative contains at least one nitrogen atom per molecule; wherein the amine initiated polyol curative has an average of at least three hydroxyl groups per molecule; 25 to 95 wt % of a high molecular weight polyol curative, wherein the high molecular weight polyol curative has a number average molecular weight, $M_N$, of 2,500 to 100,000; and wherein the high molecular weight polyol curative has an average of 3 to 10 hydroxyl groups per molecule; and, 0 to 70 wt % of a difunctional curative; and, wherein the polishing layer exhibits a density of greater than 0.6 g/cm³; a Shore D hardness of 5 to 40; an elongation to break of 100 to 450%; and, a cut rate of 25 to 150 μm/hr; wherein the endpoint detection window is a plug in place endpoint detection window block; wherein the chemical mechanical polishing pad stack has a through opening that extends from the polishing surface through the entire thickness of the polishing layer, $T_P$, the hot melt adhesive and the entire thickness of the rigid layer, $T_R$, from the top surface to the bottom surface; wherein the plug in place endpoint detection window block is disposed within the through opening; wherein the plug in place endpoint detection window block is secured to the pressure sensitive platen adhesive; and, wherein the polishing layer has a polishing surface adapted for polishing the substrate.

DETAILED DESCRIPTION

Figure 1:
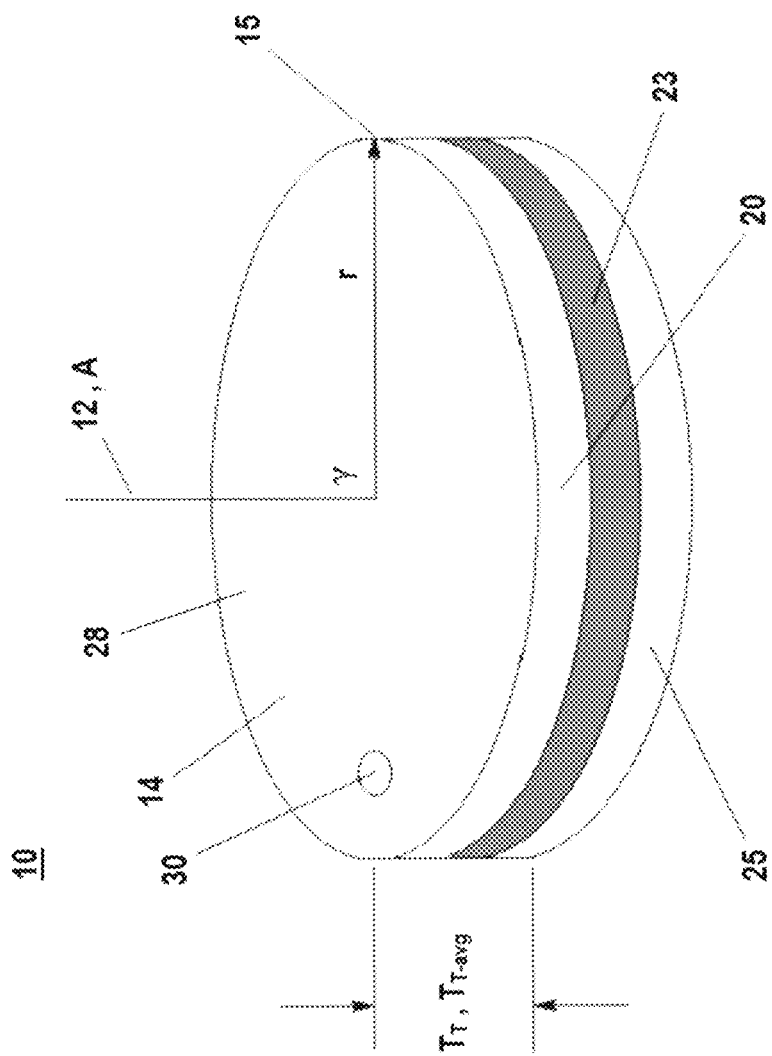
FIG. 1 is a depiction of a perspective view of a chemical mechanical polishing pad stack of the present invention.
Figure 2:
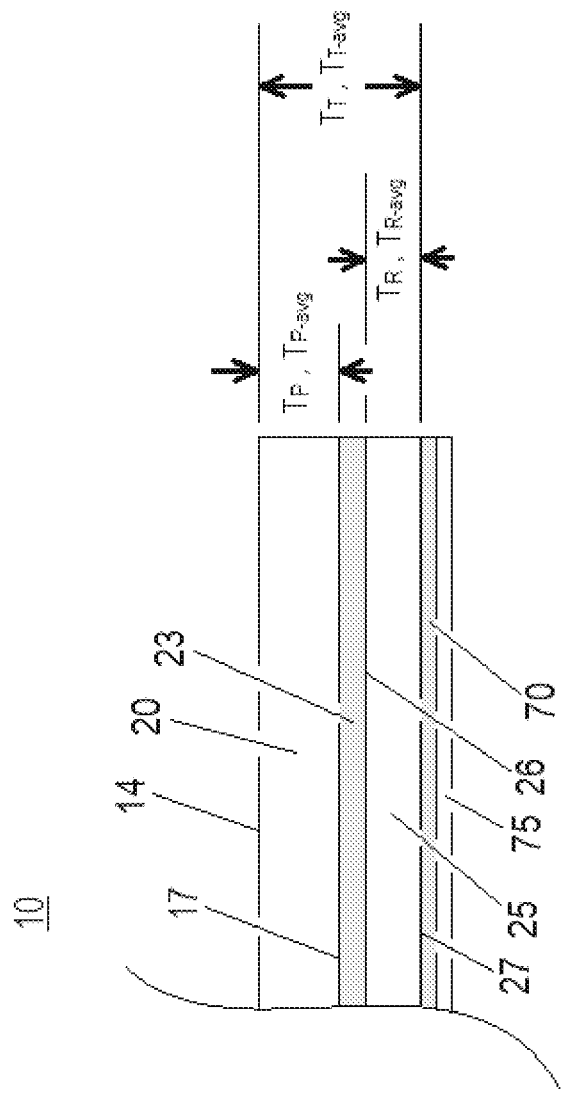
FIG. 2 is a depiction of a cross sectional cut away view of a chemical mechanical polishing pad stack of the present invention.
Figure 5:
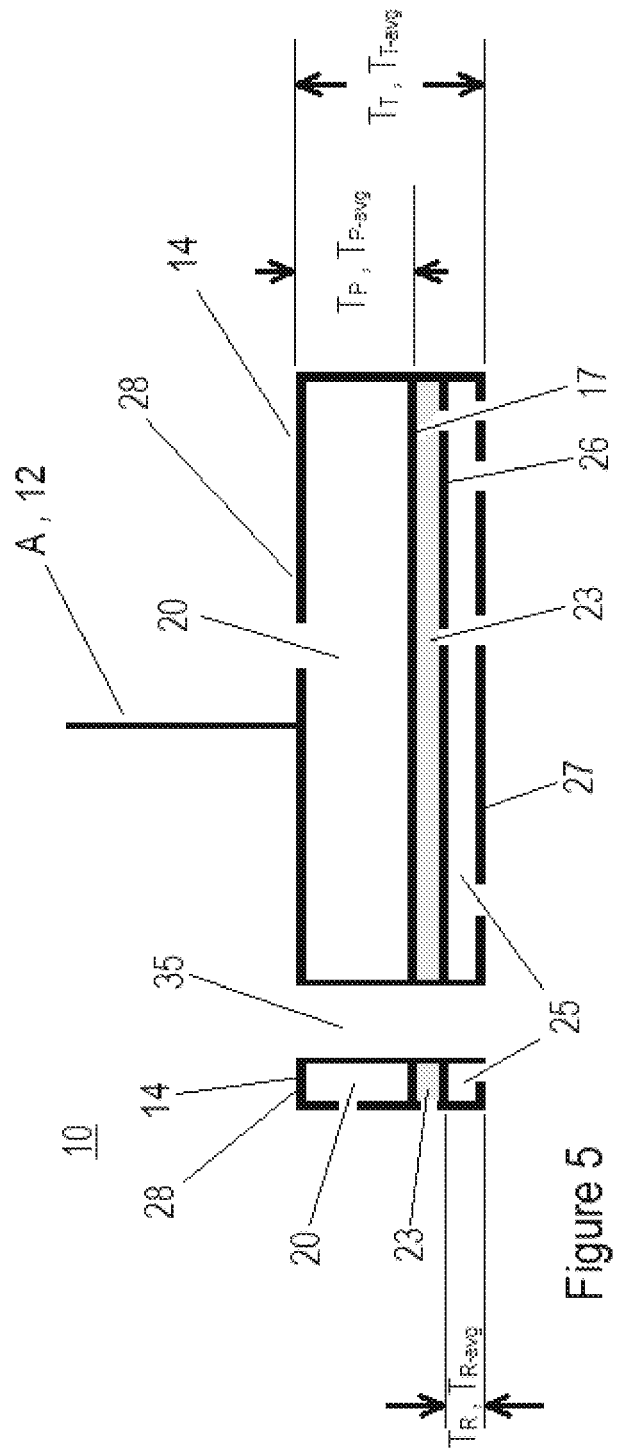
FIG. 5 is a side elevational view of a cross section of a chemical mechanical polishing pad stack of the present invention.
Figure 7:
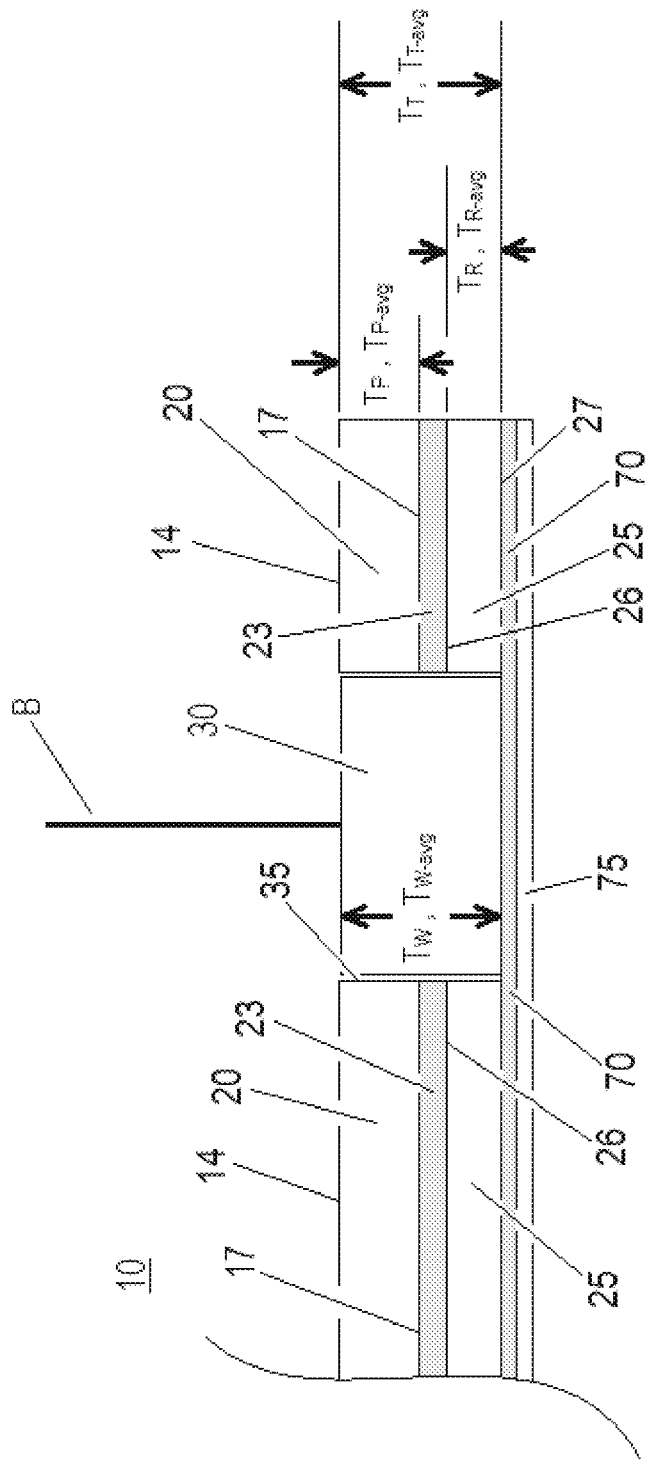
FIG. 7 is a depiction of a cross sectional cut away view of a chemical mechanical polishing pad stack of the present invention.

The term "average total thickness, $T_{T\text{-}avg}$" as used herein and in the appended claims in reference to a chemical mechanical polishing pad stack (10) having a polishing surface (14) means the average thickness, $T_T$, of the chemical mechanical polishing pad stack measured in a direction normal to the polishing surface (14) from the polishing surface (14) to the bottom surface (27) of the rigid layer (25). (See FIGS. 1, 2, 5 and 7).

The term "substantially circular cross section" as used herein and in the appended claims in reference to a chemical mechanical polishing pad stack (10) means that the longest radius, r, of the cross section from the central axis (12) to the outer perimeter (15) of the polishing surface (14) of the polishing layer (20) is ≤20% longer than the shortest radius, r, of the cross section from the central axis (12) to the outer perimeter (15) of the polishing surface (14). (See FIG. 1).

The chemical mechanical polishing pad stack (10) of the present invention is preferably adapted for rotation about a central axis (12). (See FIG. 1). Preferably, the polishing surface (14) of polishing layer (20) is in a plane (28) perpendicular to the central axis (12). The chemical mechanical polishing pad stack (10) is optionally adapted for rotation in a plane (28) that is at an angle, γ, of 85 to 95° to the central axis (12), preferably, of 90° to the central axis (12). Preferably, the polishing layer (20) has a polishing surface (14) that has a substantially circular cross section perpendicular to the central axis (12). Preferably, the radius, r, of the cross section of the polishing surface (14) perpendicular to the central axis (12) varies by ≤20% for the cross section, more preferably by ≤10% for the cross section.

The chemical mechanical polishing pad stack (10) of the present invention is specifically designed to facilitate the polishing of a substrate selected from at least one of a magnetic substrate, an optical substrate and a semiconductor substrate.

The chemical mechanical polishing pad stack (10) has a polishing layer (20) that exhibits a unique combination of low hardness (i.e., Shore D≤40) to provide low defect polishing performance and a low tensile elongation (i.e., elongation to break ≤450%) which provides both machinability to facilitate the formation of grooves in the polishing layer and conditionability to facilitate the formation of microtexture using a diamond conditioning disk. In addition, the balance of properties enabled by the polishing layer of the present invention provides the ability to, for example, polish semiconductor wafers without damaging the wafer surface by creating micro-scratch defects that could compromise the electrical integrity of the semiconductor device.

Figure 3:
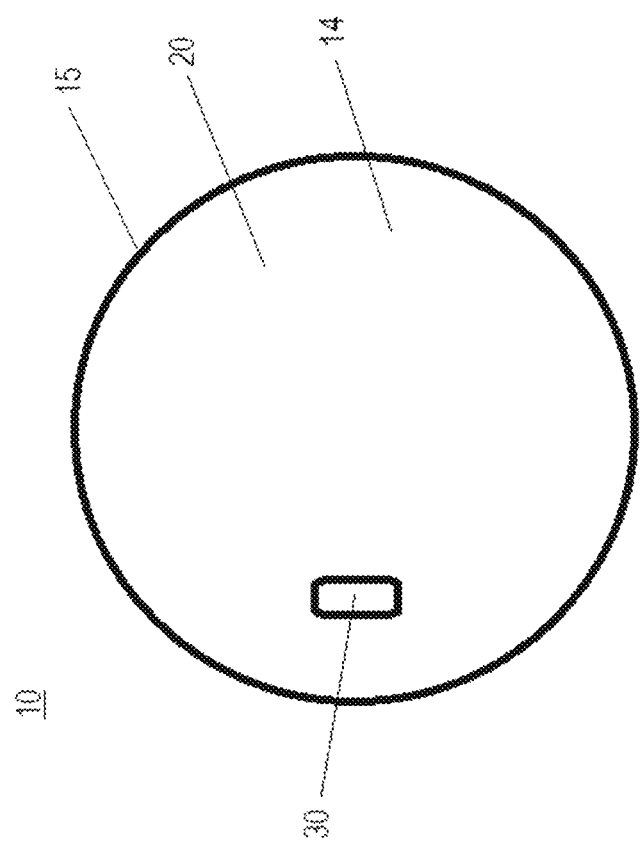
FIG. 3 is a top plan view of a chemical mechanical polishing pad stack of the present invention.
Figure 4:
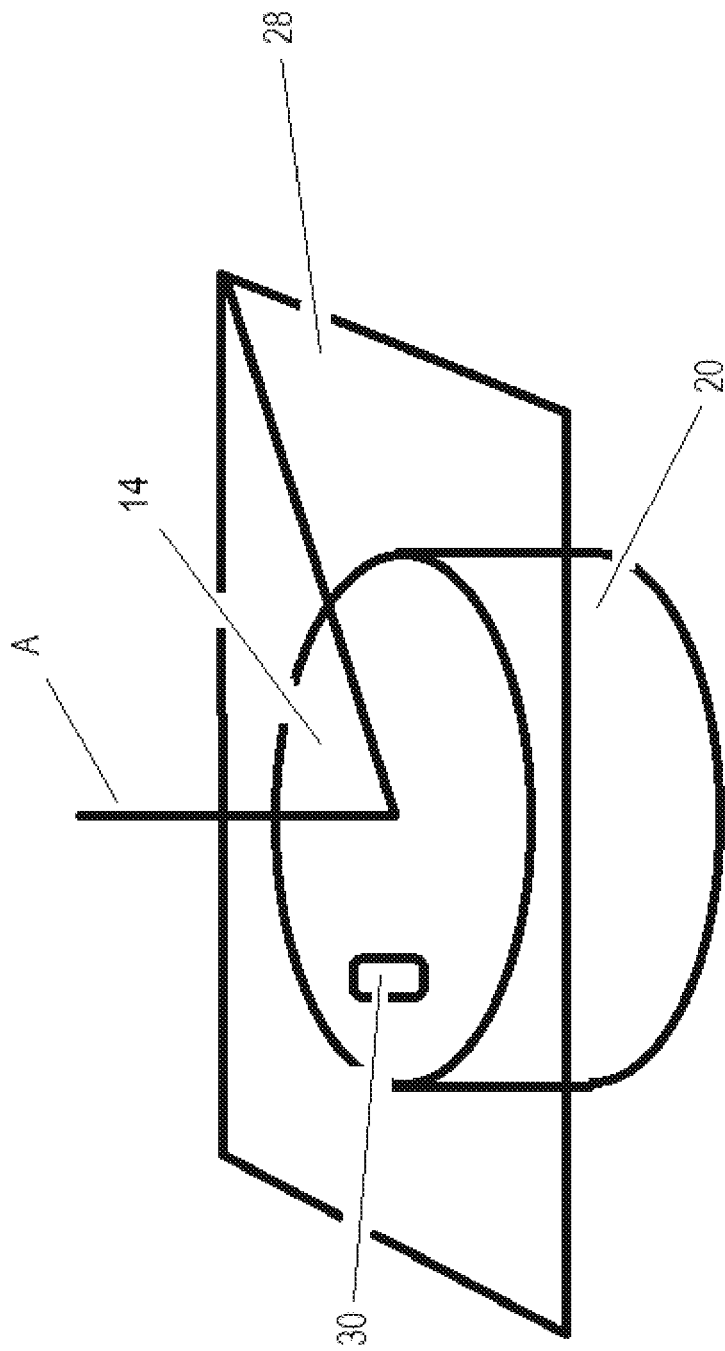
FIG. 4 is a side perspective view of a polishing layer of the present invention.
Figure 6:
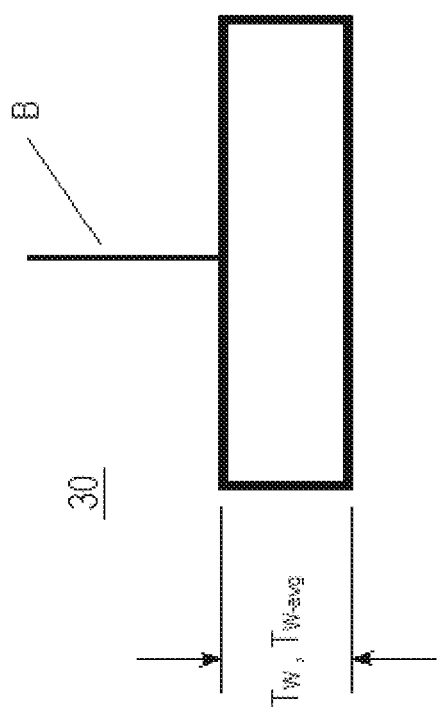
FIG. 6 is a side elevational view of a plug in place endpoint detection window block of the present invention.

The chemical mechanical polishing pad stack (10) of the present invention, comprises (preferably, consists of): a polishing layer (20) having a polishing surface (14), a base surface (17) and an average thickness, $T_{P\text{-}avg}$, measured in a direction perpendicular to the polishing surface (14) from the polishing surface (14) to the base surface (17); a rigid layer (25) having a top surface (26) and a bottom surface (27); a hot melt adhesive (23) interposed between the base surface (17) of the polishing layer (20) and the top surface (26) of the rigid layer (25); wherein the hot melt adhesive (23) bonds the polishing layer (20) to the rigid layer (25); optionally, a pressure sensitive platen adhesive (70); wherein the pressure sensitive platen adhesive (70) is disposed on the bottom surface (27) of the rigid layer (25) (preferably, wherein the optional pressure sensitive platen adhesive facilitates mounting of the chemical mechanical polishing pad stack on a polishing machine); optionally, a release liner (75); wherein the pressure sensitive platen adhesive (70) is interposed between the bottom surface (27) of the rigid layer (25) and the optional release liner (75); and, optionally, an endpoint detection window (30) incorporated into the chemical mechanical polishing pad stack (10) (preferably, wherein the endpoint detection window facilitates in situ polishing endpoint detection); wherein the polishing layer (20) comprises the reaction product of ingredients, comprising: a polyfunctional isocyanate; and, a curative package, comprising: at least 5 wt % (preferably 5 to 30 wt %; more preferably 5 to 25 wt %; most preferably 5 to 20 wt %) of an amine initiated polyol curative, wherein the amine initiated polyol curative contains at least one nitrogen atom per molecule (preferably, wherein the amine initiated polyol curative contains one to four nitrogen atoms per molecule; more preferably, wherein the amine initiated polyol curative contains two to four nitrogen atoms per molecule; most preferably, wherein the amine initiated polyol curative contains two nitrogen atoms per molecule); wherein the amine initiated polyol curative has an average of at least three hydroxyl groups (preferably 3 to 6 hydroxyl groups; more preferably 3 to 5 hydroxyl groups; most preferably 4 hydroxyl groups) per molecule; (preferably wherein the amine initiated polyol curative has a number average molecular weight of ≤700; more preferably 150 to 650; still more preferably 200 to 500; most preferably 250 to 300); 25 to 95 wt % (preferably 35 to 90 wt %; more preferably 50 to 75 wt %; most preferably 60 to 75 wt %) of a high molecular weight polyol curative, wherein the high molecular weight polyol curative has a number average molecular weight, $M_N$, of 2,500 to 100,000 (preferably 5,000 to 50,000; more preferably 7,500 to 25,000; most preferably 10,000 to 12,000); and wherein the high molecular weight polyol curative has an average of 3 to 10 hydroxyl groups (preferably 4 to 8 hydroxyl groups; more preferably 5 to 7; most preferably 6) per molecule; and, 0 to 70 wt % (preferably 5 to 60 wt %; more preferably 10 to 50 wt %; still more preferably 10 to 30 wt %; most preferably 10 to 20 wt %) of a difunctional curative; wherein the polishing layer exhibits a density of ≥0.6 g/cm$^3$ (preferably, 0.6 to 1.2 g/cm$^3$; more preferably 0.7 to 1.1 g/cm$^3$; most preferably 0.75 to 1.0 g/cm$^3$); a Shore D hardness of 5 to 40 (preferably 5 to 30; more preferably 5 to 20; most preferably 5 to 15); an elongation to break of 100 to 450% (preferably 125 to 425%; more preferably 150 to 300%; most preferably 150 to 200%); and, a cut rate of 25 to 150 μm/hr (preferably 30 to 125 μm/hr; more preferably 30 to 100 μm/hr; most preferably 30 to 60 μm/hr). (See FIGS. 1-7).

Preferably, the polyfunctional isocyanate used in the formation of the polishing layer (20) contains two reactive isocyanate groups (i.e., NCO).

Preferably, the polyfunctional isocyanate used in the formation of the polishing layer (20) is selected from the group consisting of an aliphatic polyfunctional isocyanate, an aromatic polyfunctional isocyanate and a mixture thereof. More preferably, the polyfunctional isocyanate used in the formation of the polishing layer (20) is a diisocyanate selected from the group consisting of 2,4-toluene diisocyanate; 2,6-toluene diisocyanate; 4,4'-diphenylmethane diisocyanate; naphthalene-1,5-diisocyanate; tolidine diisocyanate; para-phenylene diisocyanate; xylylene diisocyanate; isophorone diisocyanate; hexamethylene diisocyanate; 4,4'-dicyclohexylmethane diisocyanate; cyclohexanediisocyanate; and, mixtures thereof. Still more preferably, the polyfunctional isocyanate used in the formation of the polishing layer (20) is an isocyanate terminated urethane prepolymer formed by the reaction of a diisocyanate with a prepolymer polyol.

Preferably, the isocyanate-terminated urethane prepolymer used in the formation of the polishing layer (20) has 2 to 12 wt % unreacted isocyanate (NCO) groups. More preferably, the isocyanate-terminated urethane prepolymer used in the formation of the polishing layer (20) has 2 to 10 wt % (still more preferably 4 to 8 wt %; most preferably 5 to 7 wt %) unreacted isocyanate (NCO) groups.

Preferably the prepolymer polyol used to form the polyfunctional isocyanate terminated urethane prepolymer is selected from the group consisting of diols, polyols, polyol diols, copolymers thereof and mixtures thereof. More preferably, the prepolymer polyol is selected from the group consisting of polyether polyols (e.g., poly(oxytetramethylene) glycol, poly(oxypropylene)glycol and mixtures thereof); polycarbonate polyols; polyester polyols; polycaprolactone polyols; mixtures thereof; and, mixtures thereof with one or more low molecular weight polyols selected from the group consisting of ethylene glycol; 1,2-propylene glycol; 1,3-propylene glycol; 1,2-butanediol; 1,3-butanediol; 2-methyl-1,3-propanediol; 1,4-butanediol; neopentyl glycol; 1,5-pentanediol; 3-methyl-1,5-pentanediol; 1,6-hexanediol; diethylene glycol; dipropylene glycol; and, tripropylene glycol. Still more preferably, the prepolymer polyol is selected from the group consisting of polytetramethylene ether glycol (PTMEG); ester based polyols (such as ethylene adipates, butylene adipates); polypropylene ether glycols (PPG); polycaprolactone polyols; copolymers thereof; and, mixtures thereof. Most preferably, the prepolymer polyol is selected from the group consisting of PTMEG and PPG.

Preferably, when the prepolymer polyol is PTMEG, the isocyanate terminated urethane prepolymer has an unreacted isocyanate (NCO) concentration of 2 to 10 wt % (more preferably of 4 to 8 wt %; most preferably 6 to 7 wt %). Examples of commercially available PTMEG based isocyanate terminated urethane prepolymers include Imuthane® prepolymers (available from COIM USA, Inc., such as, PET-80A, PET-85A, PET-90A, PET-93A, PET-95A, PET-60D, PET-70D, PET-75D); Adiprene® prepolymers (available from Chemtura, such as, LF 800A, LF 900A, LF 910A, LF 930A, LF 931A, LF 939A, LF 950A, LF 952A, LF 600D, LF 601D, LF 650D, LF 667, LF 700D, LF750D, LF751D, LF752D, LF753D and L325); Andur® prepolymers (available from Anderson Development Company, such as, 70APLF, 80APLF, 85APLF, 90APLF, 95APLF, 60DPLF, 70APLF, 75APLF).

Preferably, when the prepolymer polyol is PPG, the isocyanate terminated urethane prepolymer has an unreacted isocyanate (NCO) concentration of 3 to 9 wt % (more preferably 4 to 8 wt %, most preferably 5 to 6 wt %). Examples of commercially available PPG based isocyanate terminated urethane prepolymers include Imuthane® prepolymers (available from COIM USA, Inc., such as, PPT-80A, PPT-90A, PPT-95A, PPT-65D, PPT-75D); Adiprene® prepolymers (available from Chemtura, such as, LFG 963A, LFG 964A, LFG 740D); and, Andur® prepolymers (available from Anderson Development Company, such as, 8000APLF, 9500APLF, 6500DPLF, 7501DPLF).

Preferably, the isocyanate terminated urethane prepolymer used in the formation of the polishing layer (20) is a low free isocyanate terminated urethane prepolymer having less than 0.1 wt % free toluene diisocyanate (TDI) monomer content.

Non-TDI based isocyanate terminated urethane prepolymers can also be used. For example, isocyanate terminated urethane prepolymers include those formed by the reaction of 4,4'-diphenylmethane diisocyanate (MDI) and polyols such as polytetramethylene glycol (PTMEG) with optional diols such as 1,4-butanediol (BDO) are acceptable. When such isocyanate terminated urethane prepolymers are used, the unreacted isocyanate (NCO) concentration is preferably 4 to 10 wt % (more preferably 4 to 8 wt %, most preferably 5 to 7 wt %). Examples of commercially available isocyanate terminated urethane prepolymers in this category include Imuthane® prepolymers (available from COIM USA, Inc. such as 27-85A, 27-90A, 27-95A); Andur® prepolymers (available from Anderson Development Company, such as, IE75AP, IE80AP, IE 85AP, IE90AP, IE95AP, IE98AP); and, Vibrathane® prepolymers (available from Chemtura, such as, B625, B635, B821).

Preferably, the curative package used in the formation of the polishing layer (20) contains: at least 5 wt % (preferably 5 to 30 wt %; more preferably 5 to 25 wt %; most preferably 5 to 20 wt %) of an amine initiated polyol curative; 25 to 95 wt % (preferably 35 to 90 wt %; more preferably 50 to 75 wt %; most preferably 60 to 75 wt %) of a high molecular weight polyol curative; and, 0 to 70 wt % (preferably 5 to 60 wt %; more preferably 10 to 15 wt %; still more preferably 10 to 30 wt %; most preferably 10 to 20 wt %) of a difunctional curative.

Preferably, the amine initiated polyol curative used in the formation of the polishing layer (20) contains at least one nitrogen atom per molecule. More preferably, the amine initiated polyol curative used contains one to four (still more preferably two to four; most preferably two) nitrogen atoms per molecule.

Preferably, the amine initiated polyol curative used in the formation of the polishing layer (20) has an average of at least three hydroxyl groups per molecule. More preferably, the amine initiated polyol curative used has an average of three to six (still more preferably three to five; most preferably four) hydroxyl groups per molecule.

Preferably, the amine initiated polyol curative used in the formation of the polishing layer (20) has a number average molecular weight, $M_N$, of ≤700. More preferably, the amine initiated polyol curative used has a number average molecular weight, $M_N$, of 150 to 650 (still more preferably 200 to 500; most preferably 250 to 300).

Preferably, the amine initiated polyol curative used in the formation of the polishing layer (20) has a hydroxyl number (as determined by ASTM Test Method D4274-11) of 350 to 1,200 mg KOH/g. More preferably, the amine initiated polyol curative used has a hydroxyl number of 400 to 1,000 mg KOH/g (most preferably 600 to 850 mg KOH/g).

Examples of commercially available amine initiated polyol curatives include the Voranol® family of amine initiated polyols (available from The Dow Chemical Company); the Quadrol® Specialty Polyols (N,N,N',N'-tetrakis(2-hydroxypropyl ethylene diamine)) (available from BASF); Pluracol® amine based polyols (available from BASF); Multranol® amine based polyols (available from Bayer MaterialScience LLC); triisopropanolamine (TIPA) (available from The Dow Chemical Company); and, triethanolamine (TEA) (available from Mallinckrodt Baker Inc.). A number of preferred amine initiated polyol curatives are listed in TABLE 1.

TABLE 1

| Amine initiated polyol curative | Number of OH groups per molecule | $M_N$ | Hydroxyl Number (mg KOH/g) |
|---|---|---|---|
| Triethanolamine | 3 | 149 | 1130 |
| Triisopropanolamine | 3 | 192 | 877 |
| MULTRANOL ® 9138 Polyol | 3 | 240 | 700 |
| MULTRANOL ® 9170 Polyol | 3 | 481 | 350 |
| VORANOL ® 391 Polyol | 4 | 568 | 391 |
| VORANOL ® 640 Polyol | 4 | 352 | 638 |
| VORANOL ® 800 Polyol | 4 | 280 | 801 |
| QUADROL ® Polyol | 4 | 292 | 770 |
| MULTRANOL ® 4050 Polyol | 4 | 356 | 630 |
| MULTRANOL ® 4063 Polyol | 4 | 488 | 460 |
| MULTRANOL ® 8114 Polyol | 4 | 568 | 395 |
| MULTRANOL ® 8120 Polyol | 4 | 623 | 360 |
| MULTRANOL ® 9181 Polyol | 4 | 291 | 770 |
| VORANOL ® 202 Polyol | 5 | 590 | 475 |

Without wishing to be bound by theory, in addition to promoting the desired balance of physical properties in the polishing layer (20) produced therewith, it is believed that the concentration of the amine initiated polyol curative used in the curative package also acts to autocatalyze its reaction and the reaction of any difunctional curative in the curative package with the unreacted isocyanate (NCO) groups present in the polyfunctional diisocyanate.

Preferably, the high molecular weight polyol curative used in the formation of the polishing layer (20) has a number average molecular weight, $M_N$, of 2,500 to 100,000. More preferably, the high molecular weight polyol curative used has a number average molecular weight, $M_N$, of 5,000 to 50,000 (still more preferably 7,500 to 25,000; most preferably 10,000 to 12,000).

Preferably, the high molecular weight polyol curative used in the formation of the polishing layer (20) has an average of three to ten hydroxyl groups per molecule. More preferably, the high molecular weight polyol curative used has an average of four to eight (still more preferably five to seven; most preferably six) hydroxyl groups per molecule.

Preferably, the high molecular weight polyol curative used in the formation of the polishing layer (20) has a molecular weight that is higher than the molecular weight of the amine initiated polyol curative used in the curative package; and, has a hydroxyl number that is lower than that of the amine initiated curative used in the curative package.

Examples of commercially available high molecular weight polyol curatives include Specflex® polyols, Voranol® polyols and Voralux® polyols (available from The Dow Chemical Company); Multranol® Specialty Polyols and Ultracel® Flexible Polyols (available from Bayer MaterialScience LLC); and Pluracol® Polyols (available from BASF). A number of preferred high molecular weight polyol curatives are listed in TABLE 2.

TABLE 2

| High molecular weight polyol curative | Number of OH groups per molecule | $M_N$ | Hydroxyl Number (mg KOH/g) |
|---|---|---|---|
| Multranol ® 3901 Polyol | 3.0 | 6,000 | 28 |
| Pluracol ® 1385 Polyol | 3.0 | 3,200 | 50 |
| Pluracol ® 380 Polyol | 3.0 | 6,500 | 25 |
| Pluracol ® 1123 Polyol | 3.0 | 7,000 | 24 |
| ULTRACEL ® 3000 Polyol | 4.0 | 7,500 | 30 |
| SPECFLEX ® NC630 Polyol | 4.2 | 7,602 | 31 |
| SPECFLEX ® NC632 Polyol | 4.7 | 8,225 | 32 |
| VORALUX ® HF 505 Polyol | 6.0 | 11,400 | 30 |
| MULTRANOL ® 9185 Polyol | 6.0 | 3,366 | 100 |
| VORANOL ® 4053 Polyol | 6.9 | 12,420 | 31 |

Preferably, the difunctional curative used in the formation of the polishing layer (20) is selected from diols and diamines. More preferably, the difunctional curative used is a diamine selected from the group consisting of primary amines and secondary amines. Still more preferably, the difunctional curative used is selected from the group consisting of diethyltoluenediamine (DETDA); 3,5-dimethylthio-2,4-toluenediamine and isomers thereof; 3,5-diethyltoluene-2,4-diamine and isomers thereof (e.g., 3,5-diethyltoluene-2,6-diamine); 4,4'-bis-(sec-butylamino)-diphenylmethane; 1,4-bis-(sec-butylamino)-benzene; 4,4'-methylene-bis-(2-chloroaniline); 4,4'-methylene-bis-(3-chloro-2,6-diethylaniline) (MCDEA); polytetramethyleneoxide-di-p-aminobenzoate; N,N'-dialkyldiamino diphenyl methane; p,p'-methylene dianiline (MDA); m-phenylenediamine (MPDA); 4,4'-methylene-bis-(2-chloroaniline) (MBOCA); 4,4'-methylene-bis-(2,6-diethylaniline) (MDEA); 4,4'-methylene-bis-(2,3-dichloroaniline) (MDCA); 4,4'-diamino-3,3'-diethyl-5,5'-dimethyl diphenylmethane, 2,2',3,3'-tetrachloro diamino diphenylmethane; trimethylene glycol di-p-aminobenzoate; and mixtures thereof. Most preferably, the diamine curing agent used is selected from the group consisting of 4,4'-methylene-bis-(2-chloroaniline) (MBOCA); 4,4'-methylene-bis-(3-chloro-2,6-diethylaniline) (MCDEA); and, isomers thereof.

Preferably, the stoichiometric ratio of the reactive hydrogen groups (i.e., the sum of the amine ($NH_2$) groups and the hydroxyl (OH) groups) in the components of the curative package to the unreacted isocyanate (NCO) groups in the polyfunctional isocyanate is 0.85 to 1.15 (more preferably 0.90 to 1.10; most preferably 0.95 to 1.05).

The polishing layer (20) optionally further comprises a plurality of microelements. Preferably, the plurality of microelements are uniformly dispersed throughout the polishing layer (20). Preferably, the plurality of microelements is selected from entrapped gas bubbles, hollow core polymeric materials, liquid filled hollow core polymeric materials, water soluble materials and an insoluble phase material (e.g., mineral oil). More preferably, the plurality of microelements is selected from entrapped gas bubbles and hollow core polymeric materials uniformly distributed throughout the polishing layer (20). Preferably, the plurality of microelements has a weight average diameter of less than 150 μm (more preferably of less than 50 μm; most preferably of 10 to 50 μm). Preferably, the plurality of microelements comprise polymeric microballoons with shell walls of either polyacrylonitrile or a polyacrylonitrile copolymer (e.g., Expancel® from Akzo Nobel). Preferably, the plurality of microelements are incorporated into the polishing layer (20) at 0 to 35 vol % porosity (more preferably 10 to 25 vol % porosity).

The polishing layer (20) can be provided in both porous and nonporous (i.e., unfilled) configurations. Preferably, the polishing layer (20) exhibits a density of ≥0.6 g/cm$^3$ as measured according to ASTM D1622. More preferably, the polishing layer (20) exhibits a density of 0.6 to 1.2 g/cm$^3$ (still more preferably 0.7 to 1.1 g/cm$^3$; most preferably 0.75 to 1.0 g/cm$^3$) as measured according to ASTM D1622.

Preferably, the polishing layer (20) exhibits a Shore D hardness of 5 to 40 as measured according to ASTM D2240. More preferably, the polishing layer (20) exhibits a Shore D hardness of 5 to 30 (still more preferably 5 to 20; most preferably 5 to 15) as measured according to ASTM D2240.

Polishing layers exhibiting a Shore D hardness of less than 40 typically have very high elongation to break values (i.e., >600%). Materials exhibiting such high elongation to break values reversibly deform when subjected to machining operations, which results in groove formation that is unacceptably poor and texture creation during diamond conditioning that is insufficient. The unique curative package used in the formation of the polishing layer (20) of the chemical mechanical polishing pad stack (10) of the present invention provides a low hardness coupled with an elongation to break of 100 to 450% as measured according to ASTM D412. Preferably, the polishing layer (20) exhibits an elongation to break of 125 to 425% (still more preferably 150 to 300%; most preferably 150 to 200%) as measured according to ASTM D412.

Preferably, the polishing layer (20) exhibits a cut rate of 25 to 150 μm/hr as measured using the method described herein in the Examples. More preferably, the polishing layer (20) exhibits a cut rate of 30 to 125 μm/hr (still more preferably 30 to 100 μm/hr; most preferably 30 to 60 μm/hr) as measured using the method described herein in the Examples.

One of ordinary skill in the art will understand to select a polishing layer (20) having a thickness, $T_P$, suitable for use in a chemical mechanical polishing pad stack (10) for a given polishing operation. Preferably, the polishing layer (20) exhibits an average thickness, $T_{P\text{-}avg}$, along an axis (A) perpendicular to a plane (28) of the polishing surface (25). More preferably, the average thickness, $T_{P\text{-}avg}$, is 20 to 150 mils (more preferably 30 to 125 mils; most preferably 40 to 120 mils). (See FIGS. 2, 5 and 7).

Preferably, the polishing surface (14) of the polishing layer (20) is adapted for polishing a substrate selected from at least one of a magnetic substrate, an optical substrate and a semiconductor substrate (more preferably, a semiconductor substrate; most preferably, a semiconductor wafer). The polishing surface (14) of the polishing layer (20) exhibits at least one of macrotexture and microtexture to facilitate polishing the substrate. Preferably, the polishing surface (14) exhibits macrotexture, wherein the macrotexture is designed to do at least one of (i) alleviate at least one of hydroplaning; (ii) influence polishing medium flow; (iii) modify the stiffness of the polishing layer; (iv) reduce edge effects; and, (v) facilitate the transfer of polishing debris away from the area between the polishing surface (14) and the substrate being polished.

The polishing surface (14) preferably exhibits macrotexture selected from at least one of perforations and grooves. Preferably, the perforations can extend from the polishing surface (14) part way or all of the way through the thickness of the polishing layer (20). Preferably, the grooves are arranged on the polishing surface (14) such that upon rotation of the pad (10) during polishing, at least one groove sweeps over the substrate. Preferably, the grooves are selected from curved grooves, linear grooves and combinations thereof. The grooves exhibit a depth of ≥10 mils (preferably, 10 to 150 mils). Preferably, the grooves form a groove pattern that comprises at least two grooves having a combination of a depth selected from ≥10 mils, ≥15 mils and 15 to 150 mils; a width selected from ≥10 mils and 10 to 100 mils; and a pitch selected from ≥30 mils, ≥50 mils, 50 to 200 mils, 70 to 200 mils, and 90 to 200 mils.

Preferably, the polishing layer (20) contains <1 ppm abrasive particles incorporated therein.

Preferably, the rigid layer (25) is made of a material selected from the group consisting of a polymer, a metal, a reinforced polymer and combinations thereof. More preferably, the rigid layer (25) is made of a polymer. Most preferably, the rigid layer (25) is made of a polymer selected from the group consisting of a polyester, a nylon, an epoxy, a fiberglass reinforced epoxy; and, a polycarbonate (more preferably, a polyester; still more preferably, a polyethylene terephthalate polyester; most preferably, a biaxially oriented polyethylene terephthalate polyester).

Preferably, the rigid layer (25) has an average thickness of >5 to 60 mils (more preferably, 6 to 30 mils; still more preferably, 6 to 15 mils; most preferably, 6 to 10 mils).

Preferably, the top surface (26) and the bottom surface (27) of the rigid layer (25) are both ungrooved. More preferably, the top surface (26) and the bottom surface (27) are both smooth. Most preferably, the top surface (26) and the bottom surface (27) have a roughness, Ra, of 1 to 500 nm (preferably, 1 to 100 nm; more preferably, 10 to 50 nm; most preferably 20 to 40 nm) as determined using an optical profilometer.

Preferably, the rigid layer (25) exhibits a Young's Modulus, measured according to ASTM D882-12, of ≥100 MPa (more preferably, 1,000 to 10,000 MPa; still more preferably, 2,500 to 7,500 MPa; most preferably, 3,000 to 7,000 MPa).

Preferably, the rigid layer (25) exhibits a void fraction of <0.1 vol % (more preferably, <0.01 vol %).

Preferably, the rigid layer (25) is made of a biaxially oriented polyethylene terephthalate having an average thickness of >5 to 60 mils (preferably, 6 to 30 mils; more preferably, 6 to 15 mils; most preferably, 6 to 10 mils); and, a Young's Modulus, measured according to ASTM D882-12, of ≥100 MPa (preferably, 1,000 to 10,000 MPa; more preferably, 2,500 to 7,500 MPa; most preferably, 3,000 to 7,000 MPa).

One of ordinary skill in the art will know how to select an appropriate hot melt adhesive (23) for use in the chemical mechanical polishing pad stack (10). Preferably, the hot melt adhesive (23) is a cured reactive hot melt adhesive. More preferably, the hot melt adhesive (23) is a cured reactive hot melt adhesive that exhibits a melting temperature in its uncured state of 50 to 150° C., preferably of 115 to 135° C. and exhibits a pot life of ≤90 minutes after melting. Most preferably, the hot melt adhesive (23) in its uncured state comprises a polyurethane resin (e.g., Mor-Melt™ R5003 available from Rohm and Haas).

The chemical mechanical polishing pad stack (10) is preferably adapted to be interfaced with a platen of a polishing machine. Preferably, the chemical mechanical polishing pad stack (10) is adapted to be affixed to the platen of a polishing machine. The chemical mechanical polishing pad stack (10) can be affixed to the platen using at least one of a pressure sensitive adhesive and vacuum.

Preferably, the chemical mechanical polishing pad stack (10) includes a pressure sensitive platen adhesive (70) applied to the bottom surface (27) of the rigid layer (25). One of ordinary skill in the art will know how to select an appropriate pressure sensitive adhesive for use as the pressure sensitive platen adhesive (70). Preferably, the chemical mechanical polishing pad stack (10) will also include a release liner (75) applied over the pressure sensitive platen adhesive (70), wherein the pressure sensitive platen adhesive (70) is interposed between the bottom surface (27) of the rigid layer (25) and the release liner (75). (See FIGS. 2 and 7).

An important step in substrate polishing operations is determining an endpoint to the process. One popular in situ method for endpoint detection involves providing a polishing pad with a window, which is transparent to select wavelengths of light. During polishing, a light beam is directed through the window to the wafer surface, where it reflects and passes back through the window to a detector (e.g., a spectrophotometer). Based on the return signal, properties of the substrate surface (e.g., the thickness of films thereon) can be determined for endpoint detection. To facilitate such light based endpoint methods, the chemical mechanical polishing pad stack (10) of the present invention, optionally further comprises an endpoint detection window. Preferably, the endpoint detection window is selected from an integral window incorporated into the polishing layer (20); and, a plug in place endpoint detection window block incorporated into the chemical mechanical polishing pad stack (10). One of ordinary skill in the art will know to select an appropriate material of construction for the endpoint detection window for use in the intended polishing process.

Preferably, the endpoint detection window used in the chemical mechanical polishing pad stack (10) of the present invention is a plug in place endpoint detection window block (30). Preferably, the chemical mechanical polishing pad stack (10) containing a plug in place endpoint detection window block (30), comprises (consists essentially of): a polishing layer (20) having a polishing surface (14), a base surface (17) and an average thickness, $T_{P\text{-}avg}$, measured in a direction perpendicular to the polishing surface (14) from the polishing surface (14) to the base surface (17); a rigid layer (25) having a top surface (26) and a bottom surface (27); a hot melt adhesive (23) interposed between the base surface (17) of the polishing layer (20) and the top surface (26) of the rigid layer (25); wherein the hot melt adhesive (23) bonds the polishing layer (20) to the rigid layer (25); a pressure sensitive platen adhesive (70); a release liner (75); wherein the pressure sensitive platen adhesive (70) is interposed between the bottom surface (27) of the rigid layer (25) and the release liner (75); and, a plug in place endpoint detection window (30) incorporated into the chemical mechanical polishing pad stack (10); wherein the polishing layer (20) comprises the reaction product of ingredients, comprising: a polyfunctional isocyanate; and, a curative package, comprising: at least 5 wt % of an amine initiated polyol curative, wherein the amine initiated polyol curative contains at least one nitrogen atom per molecule; wherein the amine initiated polyol curative has an average of at least three hydroxyl groups per molecule; 25 to 95 wt % of a high molecular weight polyol curative, wherein the high molecular weight polyol curative has a number average molecular weight, $M_N$, of 2,500 to 100,000; and wherein the high molecular weight polyol curative has an average of 3 to 10 hydroxyl groups per molecule; and, 0 to 70 wt % of a difunctional curative; wherein the polishing layer (20) exhibits a density of greater than 0.6 g/cm$^3$; a Shore D hardness of 5 to 40; an elongation to break of 100 to 450%; and, a cut rate of 25 to 150 µm/hr; wherein the polishing layer (20) has a polishing surface (14) adapted for polishing the substrate; wherein the chemical mechanical polishing pad stack (10) has a through opening (35) that extends through the chemical mechanical polishing pad stack (10) from the polishing surface (14) of the polishing layer (20) through to the bottom surface (27) of the rigid layer (25); wherein the plug in place endpoint detection window block (30) is disposed within the through opening (35); and, wherein the plug in place endpoint detection window block (30) is secured to the pressure sensitive platen adhesive (70). The plug in place endpoint detection window block (30) has a thickness, $T_W$, measured along an axis, B, perpendicular to the plane (28) of the polishing surface (14). Preferably, the plug in place endpoint detection window block (30) has an average window block thickness, $T_{W\text{-}avg}$, along an axis (B) perpendicular to the plane (28) of the polishing surface (25), wherein the average window block thickness, $T_{W\text{-}avg}$, is 5 mils to the average total thickness, $T_{T\text{-}avg}$, of the chemical mechanical polishing pad stack (10). More preferably, wherein the plug in place endpoint detection window block (30) has an average window block thickness, $T_{W\text{-}avg}$, of 5 mils to $<T_{T\text{-}avg}$. Still more preferably, wherein the plug in place endpoint detection window block (30) has an average window block thickness, $T_{W\text{-}avg}$, of 5 mils to 75 mils. (See FIGS. 1 and 3-7).

Some embodiments of the present invention will now be described in detail in the following Examples.

Comparative Examples A-B and Examples 1-19

Polishing layers were prepared according to the formulation details provided in TABLE 3. Specifically, polyurethane cakes were prepared by the controlled mixing of the isocyanate terminated urethane prepolymer at 51° C. (i.e., the Adiprene® LF667 available from for Comparative Example A and Examples 1-9; and, the Adiprene® LFG963A for Comparative Example B and Examples 10-19; both available from Chemtura Corporation) with the components of the curative package. The amine initiated polyol curative (i.e., the Voranol® 800 available from The Dow Chemical Company) and the high molecular weight polyol curative (i.e., the Voralux® HF505 available from The Dow Chemical Company) were premixed before blending in the other raw materials. All of the raw materials, except for MBOCA, were maintained at a premixing temperature of 51° C. The MBOCA was maintained at a premixing temperature of 116° C. The ratio of the isocyanate terminated urethane prepolymer and the curative package was set such that the stoichiometry, as defined by the ratio of active hydrogen groups (i.e., the sum of the —OH groups and —NH$_2$ groups) in the curatives to the unreacted isocyanate (NCO) groups in the isocyanate terminated urethane prepolymer, was as noted in Table 3.

Porosity was introduced into the polishing layers by adding Expancel® microspheres to the isocyanate terminated urethane prepolymer prior to combining with the curative package to achieve the desired porosity and pad density.

The isocyanate terminated urethane prepolymer with any incorporated Expancel® microspheres and the curative package were mixed together using a high shear mix head. After exiting the mix head, the combination was dispensed over a period of 5 minutes into a 86.4 cm (34 inch) diameter circular mold to give a total pour thickness of approximately 10 cm (4 inches). The dispensed combination was allowed to gel for 15 minutes before placing the mold in a curing oven. The mold was then cured in the curing oven using the following cycle: 30 minutes ramp from ambient temperature to a set point of 104° C., then hold for 15.5 hours at 104° C., and then 2 hour ramp from 104° C. to 21° C.

The cured polyurethane cakes were then removed from the mold and skived (cut using a moving blade) at a temperature of 30 to 80° C. into approximately forty separate 2.0 mm (80 mil) thick sheets. Skiving was initiated from the top of each cake. Any incomplete sheets were discarded.

Note that Adiprene® LF667 used in the Examples is a PTMEG based isocyanate terminated urethane prepolymer comprising a 50/50 weight percent blend of Adiprene® LF950A and Adiprene® LF600D available from Chemtura. Also note that Adiprene® LFG963A is a PPG based isocyanate terminated urethane prepolymer available from Chemtura.

chemical mechanical polishing pad stack having a nominal diameter of 51 cm (20 inches). Polishing layers having a circular cross section were prepared as described herein in the Examples. These polishing layers were then machine grooved to provide a groove pattern in the polishing surface comprising a plurality of concentric circular grooves having dimensions of 120 mil (3.05 mm) pitch, 20 mil (0.51 mm) width and 30 mil (0.76 mm) depth. The polishing layers were then laminated to a foam sub-pad layer (SP2310 available from Rohm and Haas Electronic Materials CMP Inc.)

A diamond conditioning disk (DiaGrid® AD3CL-150840-3 pad conditioner manufactured by Kinik Company) was used to abrade the polishing surface of the grooved polishing layers using the following process conditions: the polishing surface of the polishing layers were subjected to continuous abrasion from the diamond conditioning disk for a period of 2 hours, with a platen speed of 100 rpm, a deionized water flow rate of 150 $cm^3$/min and a conditioning disk down force of 48.3 kPa (7 psi). The cut rate was determined by

TABLE 3

| Ex # | Isocyanate terminated urethane prepolymer | Prepolymer (% NCO) | Curative Package (wt %) | | | Stoichiometry (Active H/NCO) | Pore Former | Expancel® Pore Former (wt %) | Pore Porosity (vol %) |
|---|---|---|---|---|---|---|---|---|---|
| | | | MBOCA | Voranol® 800 | Voralux® HF 505 | | | | |
| A | Adiprene® LF667 | 6.7 | 100 | 0 | 0 | 0.85 | 551DE40d42 | 1.8 | 35 |
| B | Adiprene® LFG963A | 5.8 | 100 | 0 | 0 | 0.9 | 551DE40d42 | 1.3 | 23 |
| 1 | Adiprene® LF667 | 6.7 | 0 | 25 | 75 | 0.97 | 920DE40d30 | 1.3 | 34 |
| 2 | Adiprene® LF667 | 6.7 | 67 | 8 | 25 | 0.97 | 920DE40d30 | 1.3 | 34 |
| 3 | Adiprene® LF667 | 6.7 | 0 | 14 | 86 | 1.0 | 551DE40d42 | 1.4 | 29 |
| 4 | Adiprene® LF667 | 6.7 | 14 | 12 | 74 | 1.0 | 551DE40d42 | 1.4 | 29 |
| 5 | Adiprene® LF667 | 6.7 | 25 | 11 | 64 | 1.0 | 551DE40d42 | 1.4 | 28 |
| 6 | Adiprene® LF667 | 6.7 | 25 | 11 | 64 | 1.0 | 551DE40d42 | 0.6 | 15 |
| 7 | Adiprene® LF667 | 6.7 | 40 | 9 | 51 | 1.0 | 551DE40d42 | 1.4 | 28 |
| 8 | Adiprene® LF667 | 6.7 | 50 | 7 | 43 | 1.0 | 551DE40d42 | 1.6 | 32 |
| 9 | Adiprene® LF667 | 6.7 | 50 | 7 | 43 | 1.0 | 551DE40d42 | 0.7 | 18 |
| 10 | Adiprene® LFG963A | 5.8 | 14 | 12 | 74 | 1.0 | 551DE20d60 | 2.0 | 28 |
| 11 | Adiprene® LFG963A | 5.8 | 33 | 10 | 57 | 1.0 | 551DE20d60 | 2.0 | 28 |
| 12 | Adiprene® LFG963A | 5.8 | 14 | 12 | 74 | 1.0 | 551DE20d60 | 1.4 | 22 |
| 13 | Adiprene® LFG963A | 5.8 | 33 | 10 | 57 | 1.0 | 551DE20d60 | 1.5 | 23 |
| 14 | Adiprene® LFG963A | 5.8 | 41 | 8 | 51 | 1.0 | 551DE20d60 | 1.4 | 22 |
| 15 | Adiprene® LFG963A | 5.8 | 33 | 10 | 57 | 1.0 | — | — | — |
| 16 | Adiprene® LFG963A | 5.8 | 0 | 25 | 75 | 1.0 | 551DE20d60 | 2.0 | 28 |
| 17 | Adiprene® LFG963A | 5.8 | 0 | 14 | 86 | 1.0 | 551DE20d60 | 1.8 | 26 |
| 18 | Adiprene® LFG963A | 5.8 | 25 | 19 | 56 | 1.0 | 551DE40d42 | 1.6 | 32 |
| 19 | Adiprene® LFG963A | 5.8 | 25 | 19 | 56 | 1.0 | 551DE40d42 | 0.7 | 17 |

The ungrooved, polishing layer materials from each of Comparative Examples A-B and Examples 1-19 were analyzed to determine their physical properties as reported in TABLE 4. Note that the density data reported were determined according to ASTM D1622; the Shore D hardness data reported were determined according to ASTM D2240; the Shore A hardness data reported were determined according to ASTM D2240; and, the elongation to break data reported were determined according to ASTM D412.

The cut rate data reported in TABLE 4 were measured using a 200 mm Mirra® polishing tool from Applied Materials. This polishing tool is designed to accommodate a circular measuring the change in the average groove depth over time. The groove depth was measured (in μm/hour) using an MTI Instruments Microtrack II Laser Triangulation Sensor mounted on a Zaber Technologies Motorized Slide to profile the polishing surface of each polishing layer from the center to the outer edge. The sweep speed of the sensor on the slide was 0.732 mm/s and the sampling rate (measurements/mm of sweep) for the sensor was 6.34 points/mm. The cut rate reported in TABLE 4 is the arithmetic average reduction in groove depth over time, based on the collected thickness measurements taken as >2,000 points across the polishing surface of the polishing layer.

TABLE 4

| Ex. # | Density (g/cm³) | Shore Hardness A | Shore Hardness D | G' @ 30° C. (MPa) | G' @ 40° C. (MPa) | G" @ 40° C. (MPa) | G' @ 30° C./ G' @ 90° C. (MPa) | Tensile strength (MPa) | Elongation to break (%) | Tensile modulus (MPa) | Toughness (MPa) | Cut rate (μm/hr) |
|---|---|---|---|---|---|---|---|---|---|---|---|---|
| A | 0.78 | 93 | 43 | — | 44.0 | 2.6 | 1.4 | 17 | 191 | 65 | 24 | 34 |
| B | 0.88 | 91 | 41 | — | 49.0 | 3.2 | 1.9 | 15 | 293 | 95 | 62 | 26 |
| 1 | 0.76 | 56 | 10 | 3.2 | 3.1 | 0.1 | 1.0 | 3 | 161 | 4 | 3 | — |
| 2 | 0.76 | 83 | 35 | 27.8 | 24.2 | 2.7 | 1.4 | 16 | 250 | 46 | 23 | — |
| 3 | 0.81 | 48 | 7 | 2.2 | 2.2 | 0.1 | 1.1 | 2 | 160 | 3 | 2 | 72 |
| 4 | 0.81 | 57 | 11 | 4.6 | 3.8 | 0.5 | 1.5 | 5 | 294 | 5 | 9 | 41 |
| 5 | 0.82 | 62 | 18 | 9.0 | 8.2 | 0.9 | 1.3 | 7 | 360 | 13 | 15 | — |
| 6 | 0.98 | 61 | 17 | 5.0 | 4.6 | 0.5 | 1.1 | 8 | 414 | 7 | 16 | — |
| 7 | 0.82 | 75 | 23 | 16.8 | 15.6 | 1.4 | 1.3 | 11 | 346 | 26 | 22 | 30 |
| 8 | 0.79 | 79 | 27 | 21.4 | 19.7 | 1.6 | 1.4 | 12 | 332 | 36 | 26 | 29 |
| 9 | 0.95 | 83 | 31 | 23.2 | 21.5 | 1.9 | 1.2 | 16 | 351 | 40 | 34 | — |
| 10 | 0.83 | 56 | 10 | 6.0 | 4.5 | 0.9 | 2.8 | 4 | 189 | 6 | 5 | 46 |
| 11 | 0.82 | 75 | 23 | 18.6 | 13.4 | 3.0 | 6.0 | 7 | 256 | 31 | 13 | — |
| 12 | 0.90 | 61 | 14 | 8.2 | 6.4 | 1.2 | 3.1 | 4 | 164 | 8 | 4 | — |
| 13 | 0.88 | 72 | 21 | 18.1 | 13.8 | 3.1 | 5.1 | 7 | 288 | 24 | 15 | — |
| 14 | 0.89 | 77 | 25 | 23.6 | 18.7 | 3.8 | 5.2 | 9 | 291 | 33 | 18 | 43 |
| 15 | 1.14 | 78 | 27 | 21.2 | 15.6 | 3.7 | 4.7 | 10 | 293 | 23 | 18 | — |
| 16 | 0.83 | 55 | 10 | 5.6 | 4.5 | 0.7 | 2.0 | 3 | 162 | 4 | 3 | — |
| 17 | 0.85 | 57 | 11 | 4.6 | 4.0 | 0.4 | 1.7 | 3 | 143 | 4 | 2 | — |
| 18 | 0.78 | 70 | 19 | 18.0 | 13.3 | 2.6 | 4.7 | 5 | 173 | 23 | 7 | — |
| 19 | 0.96 | 73 | 20 | 17.9 | 12.5 | 2.9 | 5.4 | 7 | 232 | 23 | 11 | — |

We claim:

1. A chemical mechanical polishing pad stack, comprising:
    a polishing layer having a polishing surface, a base surface and an average thickness, $T_{P\text{-}avg}$, measured in a direction perpendicular to the polishing surface from the polishing surface to the base surface;
    a rigid layer having a top surface and a bottom surface;
    a hot melt adhesive interposed between the base surface of the polishing layer and the top surface of the rigid layer; wherein the hot melt adhesive bonds the polishing layer to the rigid layer;
    optionally, a pressure sensitive platen adhesive; wherein the pressure sensitive platen adhesive is disposed on the bottom surface of the rigid layer;
    optionally, a release liner; wherein the pressure sensitive platen adhesive is interposed between the bottom surface of the rigid layer and the optional release liner; and
    optionally, an endpoint detection window incorporated into the chemical mechanical polishing pad stack;
    wherein the polishing layer comprises the reaction product of ingredients, comprising:
        a polyfunctional isocyanate; and
        a curative package, comprising:
            at least 5 wt % of an amine initiated polyol curative, wherein the amine initiated polyol curative contains at least one nitrogen atom per molecule; wherein the amine initiated polyol curative has an average of at least three hydroxyl groups per molecule;
            25 to 95 wt % of a high molecular weight polyol curative, wherein the high molecular weight polyol curative has a number average molecular weight, $M_N$, of 2,500 to 100,000; and wherein the high molecular weight polyol curative has an average of 5 to 7 hydroxyl groups per molecule; and
            0 to 70 wt % of a difunctional curative; and
    wherein the polishing layer exhibits a density of greater than 0.6 g/cm³; a Shore D hardness of 5 to 40; an elongation at break of 100 to 450%; and a cut rate of 25 to 150 μm/hr; and wherein the polishing layer has a polishing surface adapted for polishing a substrate.

2. The chemical mechanical polishing pad stack of claim 1, wherein the top surface of the rigid layer is ungrooved; and wherein the bottom surface of the rigid layer is ungrooved.

3. The chemical mechanical polishing pad stack of claim 1, wherein the top surface and the bottom surface of the rigid layer each have a roughness, Ra, of 1 to 500 nm.

4. The chemical mechanical polishing pad stack of claim 1, wherein the rigid layer has a Young's Modulus of 2,500 to 7,500 MPa.

5. The chemical mechanical polishing pad stack of claim 1, wherein the rigid layer is made of a biaxially oriented polyethylene terephthalate; wherein the rigid layer has an average thickness of 6 to 10 mils; and wherein the rigid layer exhibits a Young's Modulus of 3,000 to 7,000 MPa.

6. The chemical mechanical polishing pad stack of claim 1, wherein the polyfunctional isocyanate is an isocyanate-terminated urethane prepolymer having 2 to 12 wt % unreacted NCO groups; and
    wherein the curative package consists of:
        5 to 20 wt % of the amine initiated polyol curative, wherein the amine initiated polyol curative contains two nitrogen atoms per molecule; wherein the amine initiated polyol curative has an average of 4 hydroxyl groups per molecule; and wherein the amine initiated polyol curative has a number average molecular weight, $M_N$, of 200 to 400;
        50 to 75 wt % of the high molecular weight polyol curative, wherein the high molecular weight polyol curative has a number average molecular weight, $M_N$, of 10,000 to 12,000; and wherein the high molecular weight polyol curative has an average of 6 hydroxyl groups per molecule;
        10 to 30 wt % of the difunctional curative; wherein the difunctional curative is a diamine curative selected from the group consisting of 4,4'-methylene-bis-(2-chloroaniline) (MBOCA); 4,4'-methylene-bis-(3-chloro-2,6-diethylaniline) (MCDEA); and isomers thereof;
    wherein the stoichiometric ratio of the reactive hydrogen groups in the curative package to the unreacted isocyanate groups in the polyfunctional isocyanate is 0.95 to 1.05;

wherein the polishing layer exhibits a density of 0.75 to 1.0 g/cm$^3$; a Shore D hardness of 5 to 20; an elongation at break of 150 to 300%; and a cut rate of 30 to 60 μm/hr.

7. The chemical mechanical polishing pad stack of claim 6, wherein the isocyanate-terminated urethane prepolymer has 5 to 7 wt % unreacted NCO groups; and wherein the isocyanate-terminated urethane prepolymer exhibits a number average molecular weight, $M_N$, of 400 to 2,500.

8. The chemical mechanical polishing pad stack of claim 1, wherein the chemical mechanical polishing pad stack consists of: the polishing layer; the rigid layer; the hot melt adhesive interposed between the polishing layer and the top surface of the layer; the pressure sensitive platen adhesive; the release liner; and, optionally, an endpoint detection window;
wherein the polyfunctional isocyanate is an isocyanate-terminated urethane prepolymer having 2 to 12 wt % unreacted NCO groups; and
wherein the curative package, consists of:
5 to 20 wt % of the amine initiated polyol curative, wherein the amine initiated polyol curative contains two nitrogen atoms per molecule; wherein the amine initiated polyol curative has an average of 4 hydroxyl groups per molecule; and wherein the amine initiated polyol curative has a number average molecular weight, $M_N$, of 200 to 400;
50 to 75 wt % of the high molecular weight polyol curative, wherein the high molecular weight polyol curative has a number average molecular weight, $M_N$, of 10,000 to 12,000; and wherein the high molecular weight polyol curative has an average of 6 hydroxyl groups per molecule;
10 to 30 wt % of the difunctional curative; wherein the difunctional curative is a diamine curative selected from the group consisting of 4,4'-methylene-bis-(2-chloroaniline) (MBOCA); 4,4'-methylene-bis-(3-chloro-2,6-diethylaniline) (MCDEA); and isomers thereof;
wherein the stoichiometric ratio of the reactive hydrogen groups in the curative package to the unreacted isocyanate groups in the polyfunctional isocyanate is 0.95 to 1.05;
wherein the polishing layer exhibits a density of 0.75 to 1.0 g/cm$^3$; a Shore D hardness of 5 to 20; an elongation at break of 150 to 300%; and a cut rate of 30 to 60 μm/hr.

9. The chemical mechanical polishing pad stack of claim 8, wherein the isocyanate-terminated urethane prepolymer has 5 to 7 wt % unreacted NCO groups; and wherein the isocyanate-terminated urethane prepolymer exhibits a number average molecular weight, $M_N$, of 400 to 2,500.

10. The chemical mechanical polishing pad stack of claim 8, wherein the endpoint detection window is a plug in place endpoint detection window block; wherein the chemical mechanical polishing pad stack has a through opening that extends from the polishing surface through the entire thickness of the polishing layer, $T_P$, the hot melt adhesive and the entire thickness of the rigid layer, $T_R$, from the top surface to the bottom surface; wherein the plug in place endpoint detection window block is disposed within the through opening; and wherein the plug in place endpoint detection window block is secured to the pressure sensitive platen adhesive.

11. The chemical mechanical polishing pad stack of claim 1, wherein the substrate is selected from at least one of a magnetic substrate, an optical substrate and a semiconductor substrate.

12. The chemical mechanical polishing pad stack of claim 1, wherein the polishing layer is adapted for polishing a semiconductor wafer.

13. The chemical mechanical polishing pad stack of claim 1, wherein the polyfunctional isocyanate is an isocyanate-terminated urethane prepolymer having 2 to 12 wt % unreacted NCO groups.

14. The chemical mechanical polishing pad stack of claim 1, wherein the high molecular weight polyol curative has a number average molecular weight, $M_N$, of 7,500 to 25,000.

15. The chemical mechanical polishing pad stack of claim 1, wherein the polishing layer further comprises a plurality of hollow core polymeric materials.

16. The chemical mechanical polishing pad stack of claim 15, wherein the plurality of hollow core polymeric materials are uniformly distributed throughout the polishing layer.

17. The chemical mechanical polishing pad stack of claim 16, wherein the plurality of hollow core polymeric materials have a weight average diameter of 10 to 50 μm.

18. The chemical mechanical polishing pad stack of claim 17, wherein the plurality of hollow core polymeric materials are incorporated into the polishing layer at 10 to 25 vol % porosity.

* * * * *